United States Patent [19]

Davies et al.

[11] Patent Number: 4,650,085
[45] Date of Patent: Mar. 17, 1987

[54] ENCLOSURE STRUCTURE FOR CIRCUIT BREAKER ASSEMBLIES AND SIMILAR APPARATUS

[75] Inventors: Norman Davies, Penn Township, Westmoreland County; John D. Petrisko, West Mifflin; Allen G. Filson, McKeesport; Robert E. Wobrak, North Huntingdon, all of Pa.

[73] Assignee: Westinghouse Electric Corp., Pittsburgh, Pa.

[21] Appl. No.: 822,726

[22] Filed: Jan. 27, 1986

[51] Int. Cl.[4] .................... B65D 6/24; B65D 6/28; A47B 55/00
[52] U.S. Cl. .................... 220/4 R; 220/84; 312/108; 312/257 R; 312/257 SK
[58] Field of Search .................... 220/4 R, 4 F, 76, 84; 312/108, 257 R, 257 SK

[56] References Cited

U.S. PATENT DOCUMENTS

| | | | |
|---|---|---|---|
| 1,194,532 | 8/1916 | Melink | 220/84 |
| 1,735,375 | 11/1929 | Card | 312/257 SK |
| 1,917,764 | 7/1933 | Howie | 220/84 |
| 2,542,563 | 2/1951 | O'Neill | 220/84 |
| 3,160,305 | 12/1964 | Smith | 220/4 R |
| 3,738,726 | 6/1973 | Burst | 312/257 SK |
| 4,116,510 | 9/1978 | Franco | 220/4 R |
| 4,274,547 | 6/1981 | Takagi et al. | 220/84 |

FOREIGN PATENT DOCUMENTS

| | | | |
|---|---|---|---|
| 175990 | 2/1957 | Austria | 312/257 SK |
| 2338570 | 2/1975 | Fed. Rep. of Germany | 220/4 R |

Primary Examiner—George E. Lowrance
Attorney, Agent, or Firm—D. S. Buleza

[57] ABSTRACT

An enclosure structure for housing switchgear apparatus (such as circuit breakers) is fabricated from a pair of sheet metal panels that are held in precisely-spaced upstanding relationship by a plurality of metal cross-struts of U-shaped cross-section which mechanically interlock with apertured portions of the panels and are held in such position by triangular-shaped metal gussets which overlap and are bolted to adjacent portions of the cross-struts and panels. The cross-struts are provided with longitudinally protruding tangs at each end that are slip-fitted into and interlock with slot apertures in the panels. The width dimension of the finished enclosure structure is precisely controlled by positioning tabs on the ends of the cross-struts that are offset from the associated tangs and are drawn into abutting relationship with the inner surfaces of the respective panels when the structure is bolted together. Construction and assembly of the enclosure structure is accordingly achieved without the expensive tooling, jigs and welding operations heretofore required to manufacture such structures.

7 Claims, 10 Drawing Figures

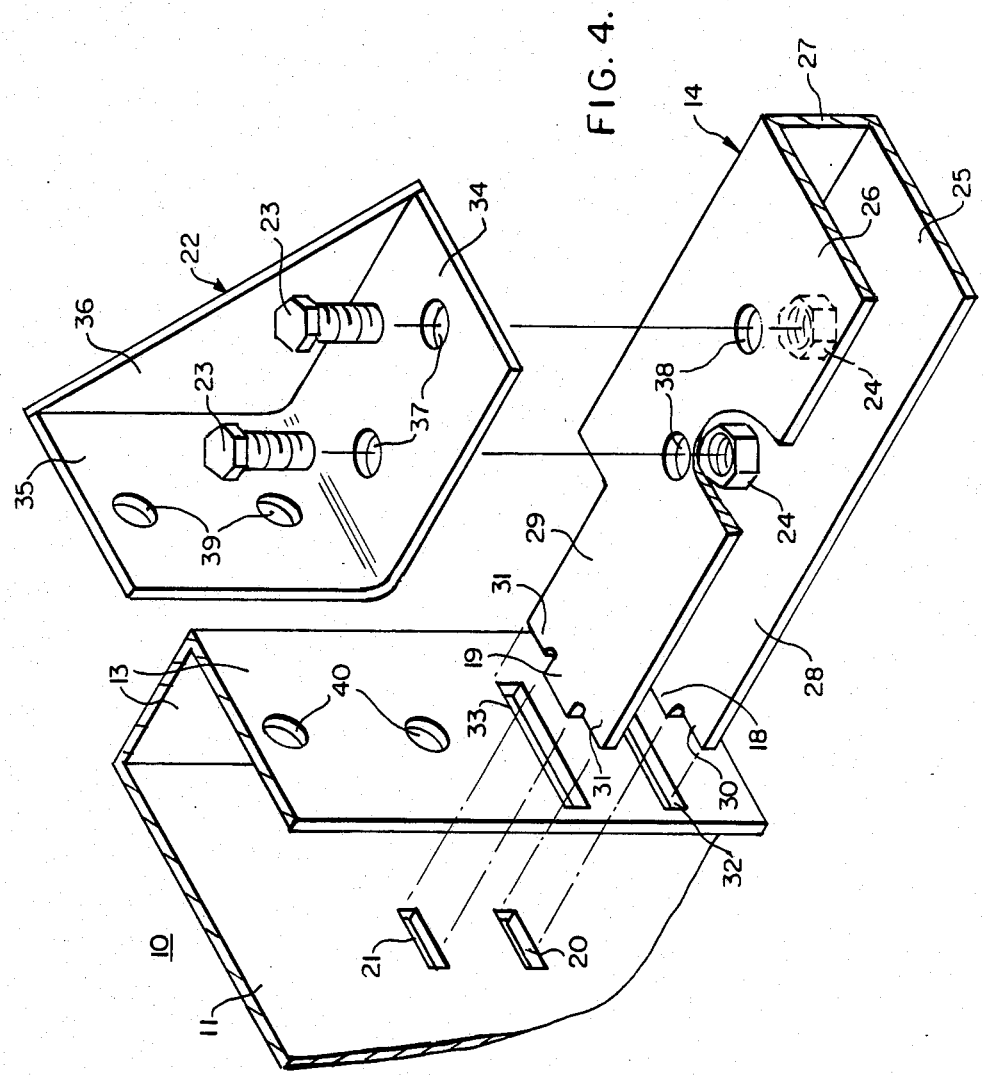

ENCLOSURE STRUCTURE FOR CIRCUIT BREAKER ASSEMBLIES AND SIMILAR APPARATUS

BACKGROUND OF THE INVENTION

1. Field of the Invention:

This invention generally relates to switchgear apparatus and, more particularly, to an improved enclosure structure for housing circuit breaker assemblies.

2. Description of the Prior Art:

Circuit breaker units of the low, medium and high voltage type require a structure or cell of sheet metal which houses and encloses the units for safety purposes and facilitates connection with the bus ducts and other auxiliary equipment. Since the circuit breaker assemblies are inserted into and mounted within such structures or enclosures, it is critical that the enclosures be manufactured in such a way that their physical dimensions meet close tolerance limits. These requirements were met in the prior art by welding the sheet metal parts of the enclosure structure together with the aid of suitable jigs or by using roll-formed parts. Since both methods of manufacture employed sophisticated and expensive tooling that required frequent maintenance, the manufacture of metal enclosures in accordance with the prior art practices was expensive and time consuming.

It would, accordingly, be very advantageous from both a manufacturing and cost standpoint if such metal enclosures and similar structures could be fabricated to the close dimensional tolerance required without the use of roll-formed parts, assembly jigs or welding operations.

SUMMARY OF THE INVENTION

The present invention achieves the foregoing advantages by providing a protective enclosure structure for switchgear and circuit breakers of various ratings and sizes that employs metal parts that can be efficiently fabricated and then rapidly assembled by fastening the parts together with bolts or other suitable threaded fasteners. The parts consist of a pair of sheet metal side panels and a plurality of metal cross-struts that are manufactured by numerical controlled-tape metal-forming equipment and are so shaped and dimensioned that the cross-struts are provided with specially shaped tabular portions at each end which permit the cross-struts to be slip-fitted into a plurality of precisely-oriented openings provided in the side panels -- thus loosely coupling the cross-struts to the panels in interfitted relationship. The cross-struts and panels are tightly locked together by a plurality of metal bracket or gusset members of right-angle configuration that are bolted to the respective side panels and associated end portions of the cross-struts to form a rigid unitary structure or cell. The side panels, cross-struts, and locking gussets are so shaped that when the gussets are fastened to the panels and cross-struts by bolts the resulting compression or "drawing together" of the parts one against the another firmly seats positioning tabs on each end of the cross-struts against the inner surfaces of the respective side panels and thus automatically controls the width dimension of the finished enclosure and ensures that it will meet the close dimensional tolerance limits.

The use of specially-shaped parts which interfit with one another in such a manner that they can be easily bolted together in precise physical relationship with one another thus permits the metal enclosure structures to be manufactured within the critical close dimensional tolerances without the use of expensive tooling to produce and assemble the parts and without welding the parts together. The various parts can also be produced at lower cost and, since they can be rapidly fabricated and accurately duplicated by the numerical controlled-tape machines, the inventory carrying cost can also be reduced.

BRIEF DESCRIPTION OF THE DRAWINGS

A better understanding of the invention will be obtained from the exemplary embodiments of the invention shown in the accompanying drawings, wherein:

FIG. 4 is an exploded fragmentary pictorial view, on an enlarged scale, of the lower left corner portion of the metal enclosure (as viewed in FIG. 1) illustrating the manner in which the tabular end portions of the cross-struts slidingly interfit with the apertured side panels and are then securely locked in place by the metal gussets and bolt fasteners;

DESCRIPTION OF THE PREFERRED EMBODIMENT

While the improved metal enclosure structure or cell of the present invention can be employed to house various kinds of electrical switching and/or control apparatus, it is particularly adapted for use as a mounting and housing structure for switchgear apparatus such as medium voltage type circuit breaker assemblies and it has accordingly been so illustrated and will be so described.

Figure 1:
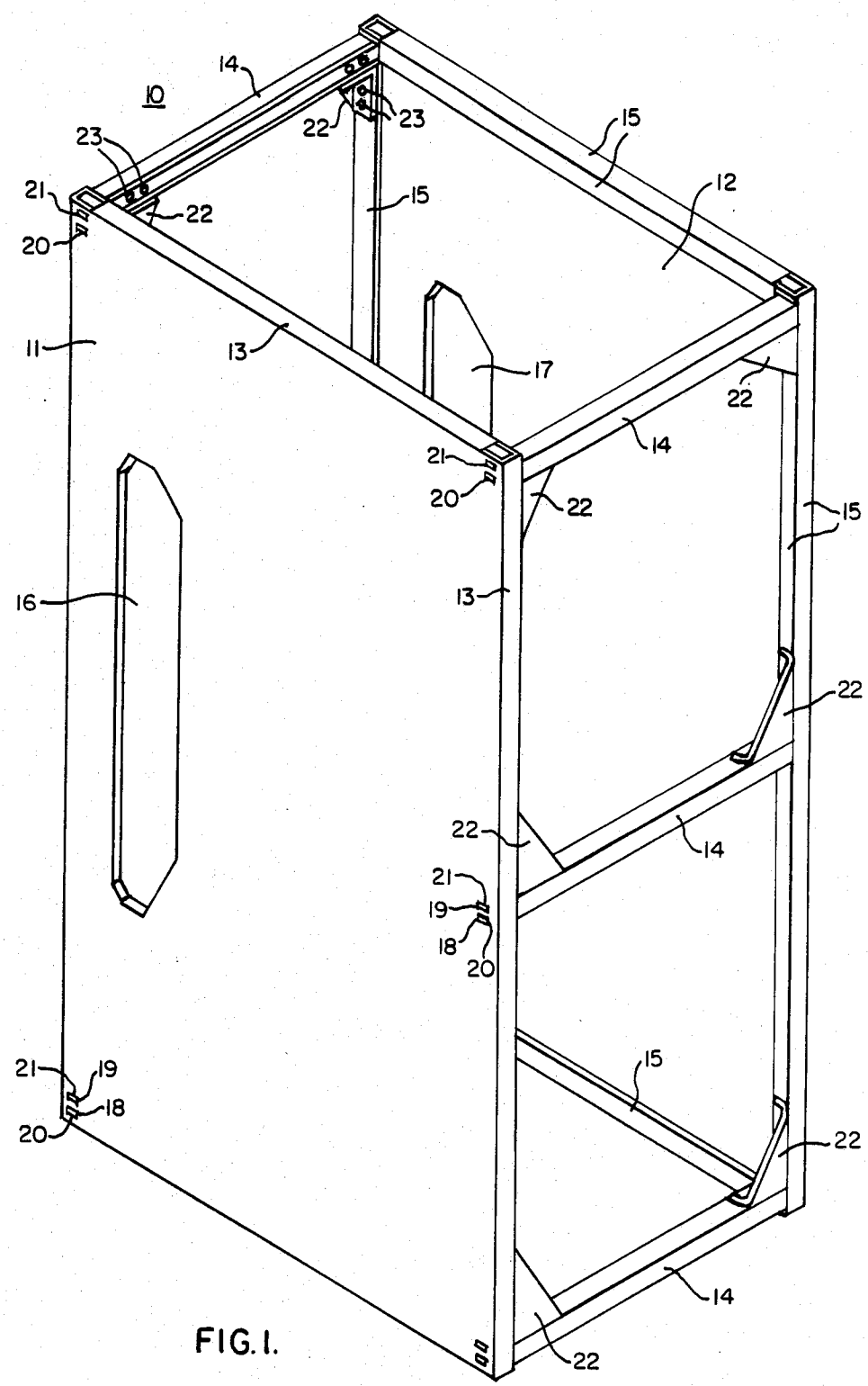
FIG. 1 is a perspective view of a metal enclosure structure or cell for medium voltage type circuit breakers which incorporates the novel construction features of the present invention.

In FIG. 1 there is shown a metal enclosure cell or structure 10 for mounting and housing such medium voltage circuit breaker assemblies in the manner well-known to those skilled in the art. As will be noted, the enclosure structure 10 is of generally rectangular configuration that is open at the top and bottom and at the front and back and is formed by a pair of sheet metal side panels 11, 12 of generally rectangular configuration and substantially the same size that are held in predetermined spaced-apart substantially parallel relationship by a plurality of metal cross-struts 14 that are of channel-like configuration. Each of the side panels 11, 12 are provided with retroverted inturned flanges 13 and 15, respectively, that are formed by bending the edges of the panels through two right angle bends so that the innermost edge portions of the panels provide flat ledges that are spaced a predetermined distance apart from and are disposed in substantially parallel relationship with the inner surfaces of the respective panels. The side panels 11, 12 are also provided with vertically elongated openings 16, 17 that are located at the back of the enclosure 10 and accommodate the bus duct assemblies that are connected to the circuit interrupters which are subsequently mounted within the enclosure.

Figure 3:
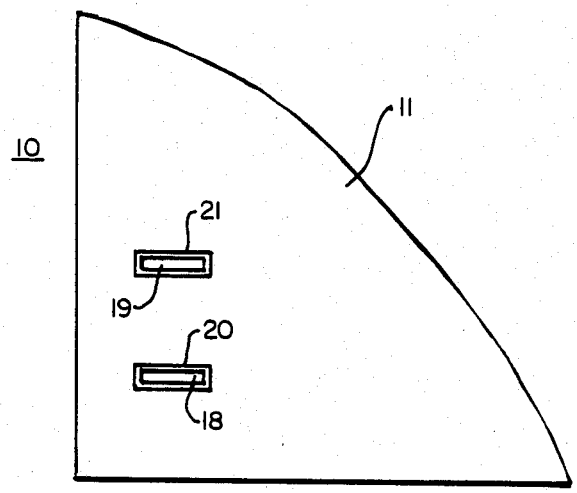
FIG. 3 is an enlarged fragmentary side elevational view of another corner of the enclosure structure illustrating the slip-interfitted relationship of the tabular ends of the cross-struts and associated slot apertures in the side panels.

The cross-struts 14 have small nibs or tangs 18, 19 at each end that slidingly fit into and engage snug-fitting slot apertures 20, 21 located at accurately spaced intervals along the sides of the panels 11, 12. As shown in FIG. 3, the pairs of interlocking tangs 18, 19 on the end portions of the cross-struts 14 are oriented in parallel-spaced horizontally-extending relationship and the paired slot apertures 20, 21 in the side panels 11, 12 are similarly oriented. In accordance with this particular embodiment, three laterally-extending cross-struts 14 are provided at the front opening of the metal enclosure 10 and two cross-struts 14 are provided at the back opening with the respective struts being fastened to the corner and central portions of the side panels 11, 12 as illustrated in FIG. 1. The panel flanges 13, 15 which extend along the top and bottom edges of the respective side panels 11, 12 are terminated short of the corners of the panels to provide sufficient clearance for the end portions of the cross-struts 14 at the corners of the enclosure 10 to slip into and engage the inturned flanges that extend along the side edges of the panels 11, 12, as described hereinafter.

The side panels 11, 12 and interfitted cross-struts 14 are securely locked together by a plurality of metal bracket or gusset members 22 of triangular shape that are located at the junctures of the cross-struts and panels. The gusset members 22 are fastened in overlapping relationship with the adjacent ledge portions of the inturned flanges 13, 15 of the side panels 11, 12 and the adjacent flat horizontal portions of the associated struts 14 by bolts 23 and nuts 24 (shown in FIGS. 2 and 4) to form a very rigid and strong unitary assembly 10.

The manner in which the cross-struts 14 slip interfit with the apertured side panels 11, 12 and are locked in firmly seated engagement therewith by means of the gusset members 22 and bolt and nut fasteners 23, 24 to automatically control the dimensions of the finished enclosure structure 10 is illustrated in detail in FIG. 4 and will now be described.

As will be noted, the cross-struts 14 are of channel-like constuction and are thus of U-shaped cross-section with two substantially flat riser segments 25, 26 that are joined by a substantially flat bridge segment 27. Each end of the cross-strut 14 is cut in such a fashion that a pair of tabular portions 28, 29 longitudinally extend from the respective riser segments 25, 26 of the strut member. As illustrated, the tabular end portions 28, 29 are terminated by generally rectangular tangs 18, 19 that extend a predetermined distance beyond the adjacent end edges of the tabular portions 28, 29 so that such edges constitute two pairs of positioning tabs 30, 31 that are offset both laterally and longitudinally from the respective tangs 18 and 19. The end edges of the positioning tabs 30, 31 are substantially straight and aligned with one another, as are the tips of the tangs 18 and 19.

Figure 2:
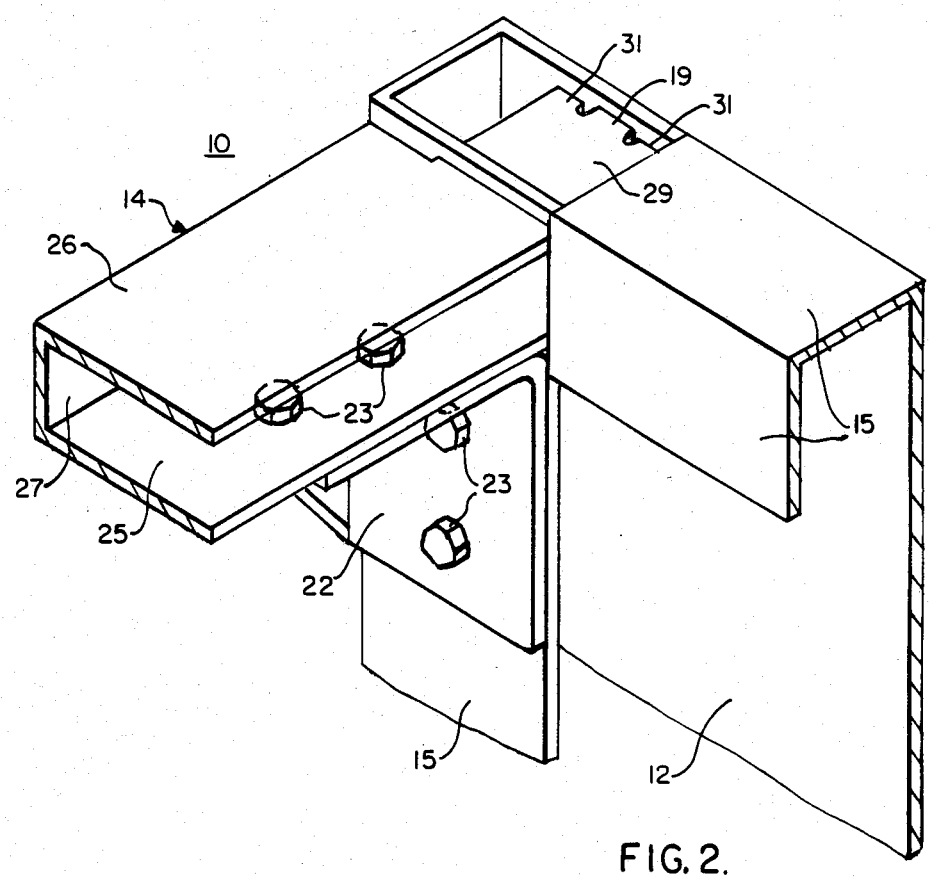
FIG. 2 is an enlarged interior perspective view of a corner portion of the metal enclosure.

The end portions of the bridge segments 27 of the cross-struts 14 are cut away and adjacent parts of the riser segments 25, 26 are also removed in such a way that the tabular end portions 28, 29 are generally rectangular in shape and of smaller width than the respective riser segments 25, 26. The cross-struts 14 are oriented so that the bridge segments 27 face outwardly from the enclosure 10 and the riser segments 25, 26 extend horizontally into the enclosure (as shown in FIGS. 1 and 2). The tabular end portions 28, 29 are dimensioned to effect a snug sliding fit with a pair of lateral slot openings 32, 33 in the inturned ledge portion of the associated panel flange 13 when the cross-strut 14 is inserted into position with the panel 11 during the assembly operation.

After the tabular end portions 28, 29 of the cross-strut 14 have passed through the slot openings 32, 33, the tips of the tangs 18, 19 enter and interlock with the pair of slot apertures 20, 21 in the main part of the panel 11. The insertion of the tabular end portions 28, 29 and tangs 18, 19 at the opposite end of the cross-strut 14 into the slot openings 32, 33 and matching set of slot apertures 20, 21 in the other panel 12 thus automatically positions each of the cross-struts 14 in laterally extending right-angle relationship with the side panels 11, 12 and positions the panels in the desired parallel spaced-apart aligned relationship.

The side panels 11, 12 and slip-interlocked cross-struts 14 are securely fastened together by the sheet metal gusset members 22 each of which consists of a right-angle bracket formed by flat plate segments 34, 35 that are bridged by a triangular-shape skirt 36, as shown in FIG. 4. The width of the bracket plate segments 34, 35 is approximately the same as the width of the riser segments 25 of the cross-struts 14 and the inturned flange ledges 13 of the panel 11 to provide a close overlapping fit. The panel 11, cross-strut 14 and gusset member 22 are secured to one another by metal bolts 23 that are inserted through a pair of snug fitting holes 37 in plate segment 34 of the gusset member 22 and another matching pair of snug fitting holes 38 provided in cross-strut 14. The bolts 23 are locked in place by nuts 24. Another pair of bolts (not shown) extend through another set of holes 39 in the upstanding plate segment 35 of the gusset member 22 and a pair of aligned holes 40 in the flange ledge 13 of the side panel 11 and are provided with nuts (not shown). The bolt fasteners 23 and nuts 24 securing the gusset members 22 to the cross-struts 14 are tightened first to lock these members together and the bolt fasteners and nuts which secure the cross-struts 14 to the flange portions 13, 15 of the panels 11, 12 are tightened afterwards so that the resulting "pulling together" of the side panels 11, 12 automatically seats the end edges of the positioning tabs 30, 31 on the strut ends against the inner surfaces of the side panels. This sequential bolt tightening automatically positions the side panels 11, 12 a precise distance apart -- thus ensuring that the width dimension of the finished enclosure structure 10 meets the established dimensional tolerance.

Figure 5:
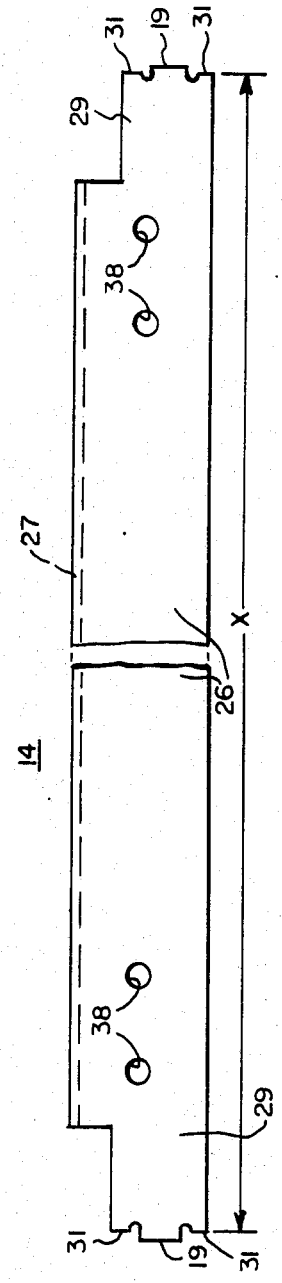
Figure 6:
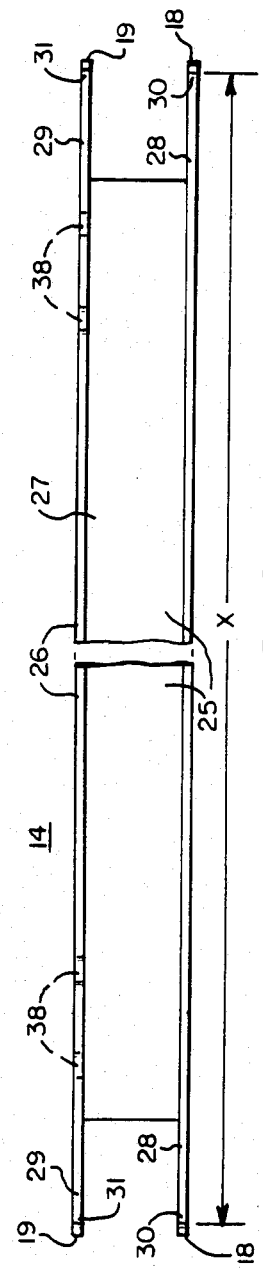

As shown in FIGS. 5 and 6, the tips or end edges of the two pairs of positioning tabs 30, 31 provided at each end of the cross-struts 14 are longitudinally spaced apart a precise distance "X" which is correlated with the desired width dimension of the finished enclosure structure 10.

Figure 7:
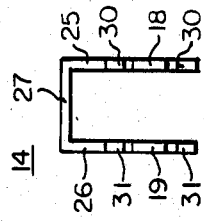
FIGS. 5, 6 and 7 are plan, side and front elevational views, respectively, of one of the cross-struts showing the structural details thereof and the relationship of the interlock tangs and positioning tabs provided at each end of these parts.

The channel-like U-shaped configuration of the cross-struts 14 and the physical arrangement of the interlock tangs 18, 19 and positioning tabs 30, 31 relative to one another are shown most clearly in FIG. 7.

Satisfactory strength and rigidity for securely mounting medium voltage type circuit breakers (and other types of heavy switchgear) within the finished enclosure structure 10 have been achieved by forming the side panels 11, 12 from hot rolled sheet steel approximately 0.074 inch (1.88 millimeters) thick and manufacturing the cross-struts 14 and locking gusset members 22 from sheet steel of approximately the same thickness by numerical controlled-tape metal forming machines.

In accordance with the illustrated embodiment, the tangs 18, 19 are preferably of such length that the tips of the tangs are substantially flush with the outer surfaces of the side panels 11, 12 when the cross-struts 14 are bolted in tight interfitted assembled relationship with the panels.

Figure 10:
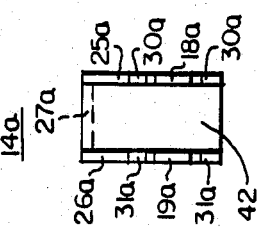
FIGS. 8, 9 and 10 are similar views of an alternative cross-strut component having a modified end structure.
Figure 8:
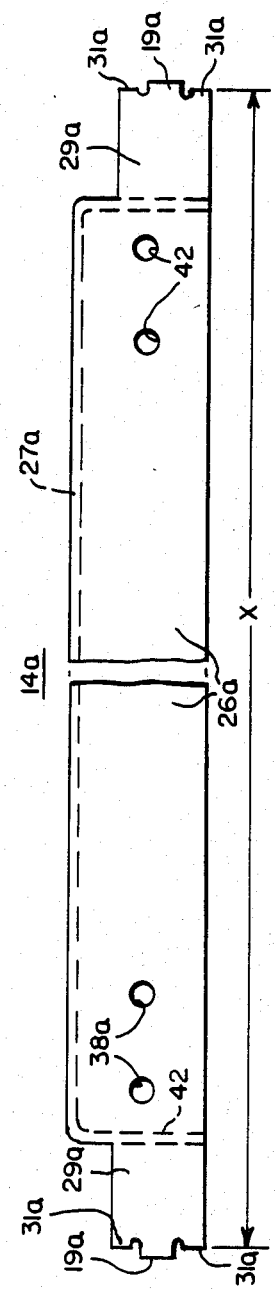
Figure 9:
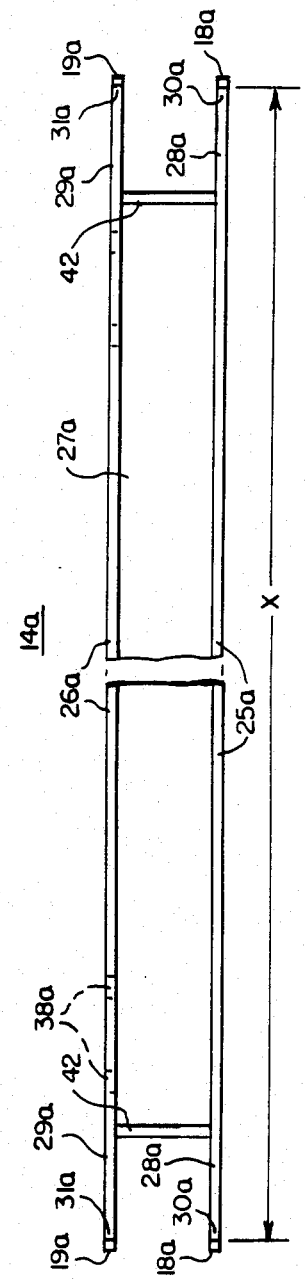

In accordance with an alternative embodiment of the invention, the part of the bridge segment 27 of the U-shaped cross-strut 14 that is removed to provide the narrow tubular end portions 28, 29 on the ends of the cross-strut is not removed but is bent around into the interior of the cross-strut to provide an inturned reinforcing truss. A cross-strut 14a having this modified construction is shown in FIGS. 8, 9 and 10. As will be noted, the ends of the bridge segment 27a of the channel-like cross-strut 14a are slit to form end panels that are bent through right angles to form the aforementioned inturned reinforcing trusses 42. Since the trusses 42 extend across the respective ends of the cross-strut 14a, they serve as upstanding supports for the associated pairs of spaced tabular end portions 28a, 29a. Parts of the riser segments 25a, 26a are cut out and removed to provide the narrow width dimensions required to permit the tabular end portions 28a, 29a to slip through the slot openings in the panel flanges. The cross-strut 14a is also provided with interlock tangs 18a, 19a and paired positioning tabs 30a, 31a as in the previous embodiment.

As will be apparent to those skilled in the art, the same manufacturing and cost advantages can be obtained by using cross-struts that have the tabular end portions, etc. and essentially comprise flat metal bars of sufficient thickness rather than U-shaped channel members of the type illustrated and described.

We claim:

1. An enclosure structure for circuit breaker assemblies and similar switchgear apparatus comprising;
    a pair of sheet metal panels of substantially the same size and shape disposed in spaced-apart vertically-extending relationship, and
    means holding said panels in precise spaced-apart substantially parallel alignment with one another comprising (a) a plurality of metal cross-struts mechanically interfitted with the respective panels by tangs that extend from the ends of said cross-struts into snug-fitting apertures in the associated panels, said apertures being located at predetermined intervals along the vertically-extending edge portions of the panels so that at least two of said cross-struts are provided along the front and back openings into the enclosure, and (b) a plurality of metal gusset members secured to said panels and adjacent end portions of the associated cross-struts by threaded fasteners which lock said cross-struts in tight interfitted relationship with said panels and form a unitary structure,
    portions of said cross-struts at each end thereof being laterally and longitudinally offset from the associated tangs and defining positioning tabs that are seated in abutting engagement with the inner surfaces of the associated panels, the positioning tabs of each of said cross-struts having substantially straight end edges that are longitudinally spaced a predetermined distance apart so that the spacing between said panels and the width dimension of the resulting metal enclosure are controlled solely by said interfitted mechanically-fastened cross-struts.

2. The enclosure structure of claim 1 wherein said threaded fasteners comprise paired bolts and nuts.

3. The enclosure structure of claim 1 wherein;
    said panels have retroverted flanges that extend inwardly along the vertically-extending side edges of said panels and are terminated by substantially flat inturned ledges that are disposed in spaced-apart substantially parallel relationship with the body portions of the respective panels,
    said ledges have laterally-extending slot openings therein that are substantially aligned with the respective interlock apertures in said panels, and
    said cross-struts have a tabular portion at each end that extends through the respective laterally-extending slot openings in the panel flange ledges and is terminated by said tang and positioning tabs,
    said gusset members being attached to the inturned flange ledges of the respective panels.

4. The enclosure stucture of claim 3 wherein;
    said cross-struts comprise sheet metal channel-like members of substantially U-shaped cross-section which have a pair of spaced riser segments that are joined by a bridge segment, and
    each of the gusset members are of generally triangular configuration and include substantially flat plate segments that are disposed in right-angled relationship and secured in overlapped relationship with the associated inturned flange ledges of said panels and one of the riser segments of the respective channel-like cross-struts.

5. The enclosure structure of claim 4, wherein;
    the tabular end portions of said channel-like cross-struts comprise the end portions of the spaced riser segments of the respective channel-like cross-struts, and
    said tabular end portions are of smaller width dimension than the associated riser segments of said channel-like cross-struts.

6. The enclosure structure of claim 5 wherein;
    said channel-like cross-struts are each oriented so that the spaced riser segments thereof laterally extend into the interior of the enclosure stucture,
    said tabular end portions and interlock tangs are both of rectangular configuration, and
    said slot openings in the flange ledges and said apertures in said panels are also of rectangular configuration.

7. The enclosure structure of claim 5 wherein;
    said tangs are of such size that the outer edges thereof are substantially flush with the outer surfaces of the respective panels, and
    said panels and enclosure structure are of generally rectangular configuration.

* * * * *